(12) United States Patent
Wang

(10) Patent No.: US 10,828,707 B2
(45) Date of Patent: Nov. 10, 2020

(54) HANDHELD MACHINE TOOL

(71) Applicant: Bosch Power Tools (China) Co., Ltd., Zhejiang (CN)

(72) Inventor: Jia Wang, Zhejiang (CN)

(73) Assignees: Bosch Power Tools (China) Co., Ltd., Zhejiang (CN); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/336,145

(22) PCT Filed: Sep. 28, 2016

(86) PCT No.: PCT/CN2016/100496
§ 371 (c)(1),
(2) Date: Mar. 25, 2019

(87) PCT Pub. No.: WO2018/058349
PCT Pub. Date: Apr. 5, 2018

(65) Prior Publication Data
US 2019/0224765 A1    Jul. 25, 2019

(51) Int. Cl.
*B23D 51/16* (2006.01)
*B23D 49/16* (2006.01)
(Continued)

(52) U.S. Cl.
CPC .............. *B23D 51/16* (2013.01); *B23D 49/16* (2013.01); *B25F 5/001* (2013.01); *B27B 3/12* (2013.01)

(58) Field of Classification Search
CPC .......... B23D 51/16; B23D 49/16; B27B 3/12; B25F 5/001
See application file for complete search history.

(56) References Cited

U.S. PATENT DOCUMENTS 3,971,132 A * 7/1976 Griffies ................ B23D 49/162
30/393
5,860,218 A    1/1999 Vinciguerra
(Continued)

FOREIGN PATENT DOCUMENTS

CN    2671742 Y    1/2005
CN    101036951 A    9/2007
(Continued)

OTHER PUBLICATIONS

International Search Report corresponding to PCT Application No. PCT/CN2016/100496, dated Jun. 30, 2017 (Chinese and English language document) (6 pages).

*Primary Examiner* — Hwei-Siu C Payer
(74) *Attorney, Agent, or Firm* — Maginot, Moore & Beck LLP

(57) ABSTRACT

The present disclosure relates to a hand-held machine tool. The hand-held machine tool includes: a first moving component as a main vibration source, the first moving component reciprocating substantially in a straight line in a first direction; a second moving component as a secondary vibration source, the second moving component having a movement state different from that of the first moving component; and a balancing block, with a linear movement direction of the balancing block being a second direction in a different plane from that of the first direction, and a movement pace of the balancing block being opposite to that of the first moving component.

19 Claims, 7 Drawing Sheets

(51) Int. Cl.
  *B25F 5/00* (2006.01)
  *B27B 3/12* (2006.01)

(56) References Cited

U.S. PATENT DOCUMENTS

| | | | | |
|---|---|---|---|---|
| 9,061,411 | B2* | 6/2015 | Naughton | B23D 49/11 |
| 9,272,347 | B2* | 3/2016 | Holmes | B23D 49/165 |
| 10,471,525 | B2* | 11/2019 | Haas | B23D 51/16 |
| 2004/0117993 | A1* | 6/2004 | Armstrong | B23D 49/165 |
| | | | | 30/392 |
| 2007/0214660 | A1* | 9/2007 | Bone | B23D 49/165 |
| | | | | 30/392 |
| 2008/0189961 | A1* | 8/2008 | Oberheim | B23D 49/165 |
| | | | | 30/393 |
| 2012/0192440 | A1* | 8/2012 | Jerabek | B23D 49/165 |
| | | | | 30/393 |
| 2013/0019483 | A1* | 1/2013 | Naughton | B23D 49/162 |
| | | | | 30/376 |
| 2014/0283394 | A1* | 9/2014 | Adams | B23D 51/16 |
| | | | | 30/374 |
| 2015/0367494 | A1* | 12/2015 | Wang | B25F 5/006 |
| | | | | 30/392 |
| 2019/0224765 | A1* | 7/2019 | Wang | B23D 51/16 |
| 2020/0070265 | A1* | 3/2020 | Wang | B23D 49/16 |

FOREIGN PATENT DOCUMENTS

| | | |
|---|---|---|
| CN | 202556373 U | 11/2012 |
| CN | 103717337 A | 4/2014 |
| JP | 2011-115912 A | 6/2011 |

\* cited by examiner

HANDHELD MACHINE TOOL

This application is a 35 U.S.C. § 371 National Stage Application of PCT/CN2016/100496, filed on Sep. 28, 2016, the disclosure of which is incorporated herein by reference in its entirety.

The present disclosure relates to the technical field of hand-held machine tools, in particular to a hand-held machine tool having a vibration-balancing function.

BACKGROUND

Various types of power-driven hand-held machine tools experience very complex vibration when in an operational state. For example, different moving components inside a machine tool might have completely different movement directions and movement types, but all contribute to the vibration of the tool, together determining the complexity of the tool's vibration.

In the prior art, awareness of such complexity is often lacking.

For example, in the case of hand-held reciprocating saws such as jigsaws, since these contain a linearly reciprocating component such as a saw blade which plays a leading role in the vibration of the saw, in the prior art a vibration-balancing block has been arranged solely on the basis of the reciprocal motion of the linearly reciprocating component, without taking into account the effects of other components on vibration. Typically, in one solution in the prior art, a balancing block is provided for a reciprocating saw, such that the balancing block reciprocates parallel to a movement direction of the linearly reciprocating component, at a pace opposite to that of the reciprocating component. In another solution in the prior art, the balancing block provided for the reciprocating saw reciprocates in a direction intersecting the movement direction of the linearly reciprocating component of the saw, at a pace opposite to that of the linearly reciprocating component.

The balancing blocks in these two existing technical solutions only take into account the inertia force and/or inertia torque of the linearly reciprocating component itself; they fail to consider the machine tool in its entirety, ignoring the effects of other moving components in the machine tool on the vibration of the machine tool. As a result, the vibration-balancing effect in the machine tool is far from ideal. In hand-held machine tools in particular, this is manifested as obvious vibration or even swinging continuing to occur close to a hand-held region, despite the use of the abovementioned vibration-balancing block; this increases the difficulty of operation, and has an adverse effect on the precision of operation.

SUMMARY

An object of the present disclosure is to provide a hand-held machine tool capable of solving the abovementioned technical problem in the prior art.

In order to achieve the abovementioned object, the present disclosure provides a hand-held machine tool, comprising:
  a first moving component as a main vibration source, the first moving component reciprocating substantially in a straight line in a first direction;
  a second moving component as a secondary vibration source, the second moving component having a movement state different from that of the first moving component; and
  a balancing block, with a linear movement direction of the balancing block being a second direction in a different plane from that of the first direction, and a movement pace of the balancing block being opposite to that of the first moving component.

The hand-held machine tool designed in this way can effectively provide vibration or impact balance, helping to increase the operational stability and operational precision thereof.

Optionally, in the hand-held machine tool described above, an included angle of the first direction and the second direction is set such that the stability of a specific region of the hand-held machine tool is optimized when the hand-held machine tool is operating.

Optionally, in the hand-held machine tool described above, the specific region is a hand-grip region of the hand-held machine tool.

The hand-held machine tool designed in this way enables the stability of a specific region thereof to be optimized during operation; the specific region may for example be a hand-grip region, etc.

Optionally, in the hand-held machine tool described above, the hand-held machine tool further comprises a linked-movement mechanism between the first moving component and the balancing block.

Optionally, in the hand-held machine tool described above, the linked-movement mechanism is a crank slideway mechanism or an oscillating bearing mechanism.

Optionally, in the hand-held machine tool described above, the hand-held machine tool comprises a guide member for guiding a movement direction of the balancing block.

Optionally, in the hand-held machine tool described above, the guide member is a guide groove or a guide rod.

Optionally, in the hand-held machine tool described above, a first slide groove and a second slide groove are formed at two ends of the balancing block respectively, the first slide groove and the second slide groove being parallel or on the same line, and
  the guide member has a flat guide face, with guide pins being provided on the guide face in the second direction, the guide pins being engaged in the first slide groove and the second slide groove of the balancing block respectively, and backstop members on the guide pins limiting the balancing block to being in close contact with the guide face.

In the hand-held machine tool designed in this way, guidance of the balancing block is achieved via a simple structure; the structure is simple and compact, and all of the components are easy to machine and assemble, so associated costs can be correspondingly lowered.

Optionally, in the hand-held machine tool described above, the guide member has a recess or through-hole for avoiding interference.

Optionally, in the hand-held machine tool described above, the first direction passes through the centre of mass of the first moving component, and the second direction passes through the centre of mass of the balancing block.

Optionally, in the hand-held machine tool described above, the hand-held machine tool is a hand-held reciprocating saw and the first moving component is a saw blade or a saw blade drive mechanism, or the hand-held machine tool is a hand-held electric hammer and the first moving component is a hammer implement or a hammer implement drive mechanism.

Optionally, in the hand-held machine tool described above, the second moving component comprises a gear which rotates in a plane parallel to the first direction, the gear simultaneously driving the first moving component and the balancing block to move, and the movement state comprising a movement state causing the gear itself to have an inertia force in a direction other than the first direction when rotating.

Optionally, in the hand-held machine tool described above, the second moving component comprises a gear, and the centre of mass of the machine tool as a whole and the first direction define a centre of mass plane, the movement state comprising a movement state causing the gear itself to have an inertia force outside the centre of mass plane when rotating.

Optionally, in the hand-held machine tool described above, the second moving component further comprises an accompanying moving component, which is driven by the gear and swings outside the centre of mass plane.

Optionally, in the hand-held machine tool described above, the accompanying moving component is a swing rod member, which is associated with the gear and periodically drives the first moving component to swing forwards.

Optionally, in the hand-held machine tool described above, the movement state further comprises a movement state causing the gear itself to have a tendency to turn over perpendicularly to a gear shaft when rotating.

BRIEF DESCRIPTION OF THE DRAWINGS

If reference is made to the accompanying drawings, the disclosed content of the present disclosure will become more obvious. It should be understood that these drawings are intended merely to explain, not to constitute a restriction on the scope of protection of the present disclosure. In the drawings.

DETAILED DESCRIPTION

Figure 1:
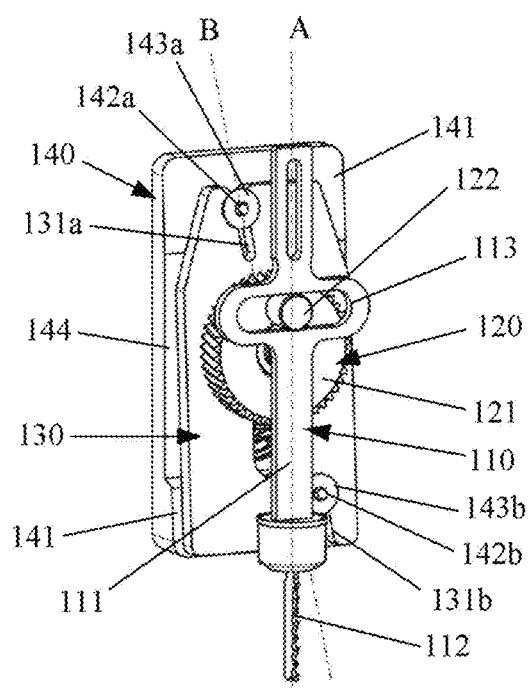
FIG. 1 shows an arrangement of a balancing block in a hand-held machine tool according to an embodiment of the present disclosure, in a schematic three-dimensional drawing.

Particular embodiments of the present disclosure are explained in detail below with reference to the accompanying drawings. In the drawings, identical reference labels indicate identical or corresponding technical features.

In the embodiments shown in the drawings, the present application demonstratively describes the use of a balancing block in a hand-held reciprocating saw having a saw blade. Those skilled in the art will realize that the balancing block in the hand-held reciprocating saw according to the present disclosure will be able to be used in various hand-held machine tools, for the purpose of balancing vibration, shaking and swinging etc. thereof mainly caused by a substantially linearly reciprocating component and additionally a second moving component having a movement state different from that of the substantially linearly reciprocating component. The "different movement state" may comprise any movement state which is different in nature or direction from the abovementioned linear reciprocation, or in which a force or torque on the saw acts at a different position.

It will be realized that these hand-held machine tools may include but are not limited to the abovementioned hand-held reciprocating saw and the hand-held electric hammer mentioned hereinbelow, etc.

Figure 2:
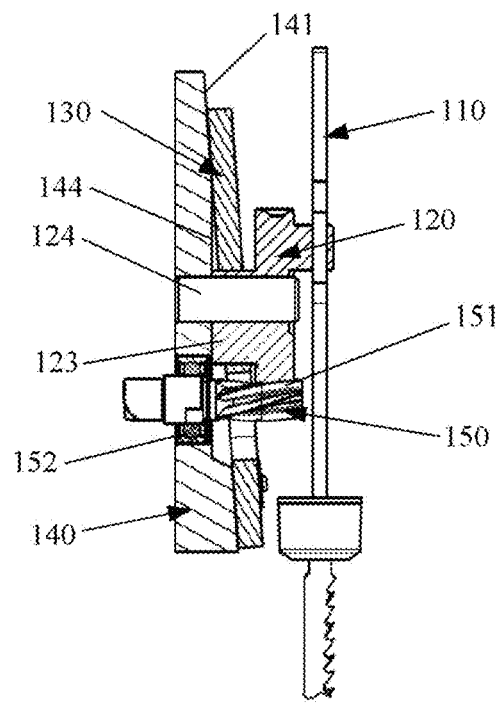
FIG. 2 shows the arrangement in FIG. 1, in a schematic sectional side view.

FIGS. 1 and 2 show the arrangement of a balancing block in a hand-held machine tool in an embodiment of the present disclosure, as a schematic three-dimensional view and a sectional side view respectively. The arrangement of the vibration-balancing block of the hand-held machine tool can be basically understood from FIGS. 1 and 2.

In this embodiment shown in the figures, the balancing block 130 is used in a saw having a saw blade 112. In the saw, the balancing block 130 and the saw blade 112 are driven via a crank slideway mechanism. Specifically, when the saw is operating, a gear 121 having a drive pin 122 and an eccentric wheel 123 drives a saw blade drive mechanism 111 and a balancing block 130; the saw blade 112 and the saw blade drive mechanism 111 reciprocate substantially in a straight line in a first direction A to perform a cutting action, whereas the balancing block 130 reciprocates at a pace opposite to that of the saw blade 112 and the saw blade drive mechanism 111 in a second direction B in a different plane. It will be understood that the "different plane" in the present application indicates that the first direction A and the second direction B are not in the same plane; they are non-parallel and do not intersect.

In the saw, the saw blade 112 and/or the saw blade drive mechanism 111 may be regarded as a first moving component 110; a linked-movement mechanism comprising the gear may be regarded as a second moving component 120 or a part thereof. Clearly, the first moving component 110, the second moving component 120 and the balancing block 130 etc. mentioned here need not each be single members; they could also be assemblies. For example, in the example in the figures, the combination of the saw blade drive mechanism 111 and the saw blade 112 may be regarded as the first moving component. The linked-movement mechanism serving as the second moving component 120 here also comprises the gear 121 (the drive pin 122 and the eccentric wheel 123 etc. are also present on the gear 121), a drive gear 151 and a bearing 152, etc. The linked-movement mechanism supplies motive power from a motive power source such as an electric motor to the saw blade drive mechanism 111 and the balancing block 130, and drives them to act together.

In the operating process of the saw, the saw blade drive mechanism 111 can drive the saw blade 112 to reciprocate substantially in a straight line in the first direction A; the second moving component in the saw has a movement state different from that of the saw blade. For example, all the components in the linked-movement mechanism rotate. In order to balance the vibration generated by the first moving component 110 and the second moving component 120 comprising the linked-movement mechanism, the present disclosure has the balancing block 130 reciprocate in a straight line in the second direction B in a different plane from that of the first direction A, and thereby achieves a good result. The first direction and the second direction may be adjusted so that when the hand-held machine tool is operating, the stability of a specific region thereof is optimized. It will be understood that the "specific region" mentioned here is a region which may be selected at will by those skilled in the art according to design needs, and is therefore clear and definite. The specific region may for example be a hand-grip region 100 (see FIG. 10), etc. to facilitate gripping. The optimization of stability may be determined via a mean value of acceleration of the specific region; this parameter more precisely reflects the degree of vibration.

Figure 3:
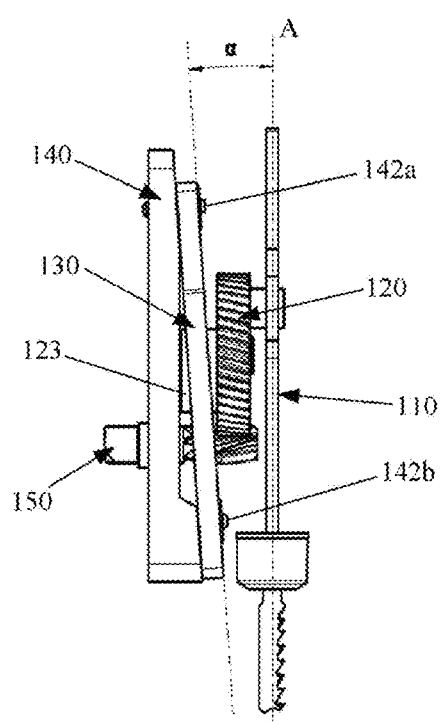
FIG. 3 shows the arrangement in FIG. 1, in a schematic side view.
Figure 4:
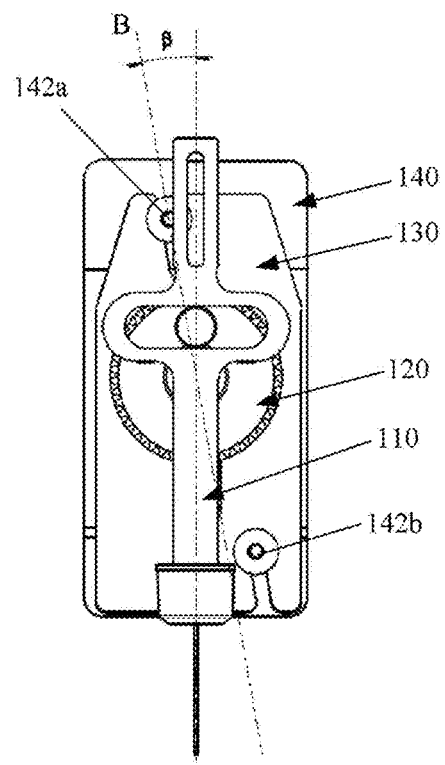
FIG. 4 shows the arrangement in FIG. 1, in a schematic front view.

FIGS. 3 and 4 demonstrate more clearly the relationship between the movement directions of the saw blade drive mechanism 111 and the balancing piece 130. As shown in FIG. 3, a guide face 141 may be inclined relative to the first direction A; an included angle of inclination therebetween is as shown by a. In an optional embodiment, the angle α may be zero. However, when the angle α is zero, it is still necessary to ensure that the second direction B is in a different plane from that of the first direction A, i.e. the second direction B should not be parallel to the first direction A. It will be understood that in any situation, an angle between the first direction A and the second direction B as shown in FIG. 4 cannot be zero; this condition is necessary to enable the balancing block to generate an inertia force component in the left/right direction in FIG. 4, so as to balance vibration of the tool in this direction. When a and are simultaneously not zero, the balancing block is able to balance vibration of the hand-held machine tool in the three directions X, Y and Z.

Figure 9:
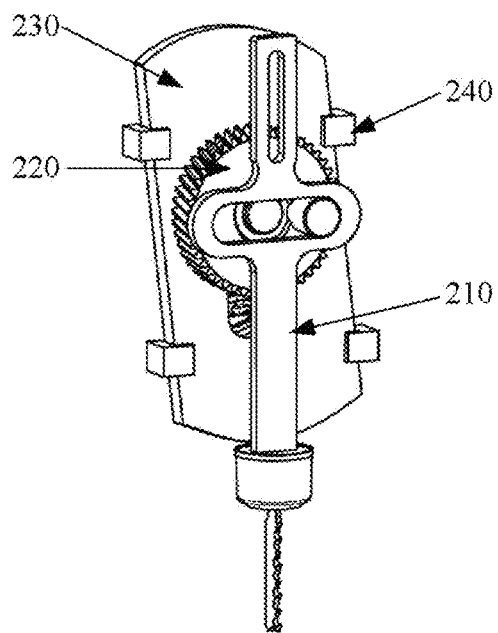
FIG. 9 shows an arrangement of a balancing block in a hand-held machine tool according to another embodiment of the present disclosure, in a schematic three-dimensional drawing.

In order to realize the abovementioned reciprocation of the balancing block 130 in the hand-held machine tool, a guide member may be provided for the balancing block. Specifically, a guide member 140 for guiding the movement direction of the balancing block 130 is shown in the figure. Although not shown explicitly in the figures, those skilled in the art will realize that another guide member for guiding the movement direction of the first moving component 110 may be provided; this is not described superfluously here. Depending on the specific circumstances, the guide member 140 need not be limited to the structure shown in the figures. For example but without limitation, it may be realized by placing two sides of the balancing block in guide grooves, as shown in FIG. 9, or may take the form of a guide rod, with the balancing block being made to slide on the guide rod. The guide member 140 may be fixed; specifically, in the hand-held machine tool, the guide member 140 may be fixed to a frame of the machine tool, or be integrally formed on the frame.

The specific structure of each component in the embodiment of FIGS. 1 and 2 is explained in detail below.

It can be seen that in the example shown in FIGS. 1 and 2, the saw blade drive mechanism 111 may be a long component, with an extremity thereof being connected to the saw blade 112. An obround hole 113 may be formed at a driven region of the saw blade drive mechanism 111. The obround hole 113 may be transversely formed on the saw blade drive mechanism 111, and has a straight upper edge, a straight lower edge and arcuate end edges at two sides; the obround hole and the drive pin 122 on the gear 121 form a crank slideway mechanism.

Here, the upper edge and the lower edge of the obround hole 113 serve as a working part. The height of the obround hole 113 may be set such that the upper edge and lower edge thereof are substantially in contact with the drive pin 122 on the gear 121 inserted in the obround hole 113 in a connected manner. When the gear 121 rotates, the drive pin 122 turns on the gear 121, and acts on the upper edge or lower edge of the obround hole, thereby driving the saw blade drive mechanism 111 and the saw blade 112 to reciprocate in a straight line. In the course of operation, the transverse length of the obround hole 113 is such that the two arcuate end edges are never driven by the drive pin 122 or are never in contact with the drive pin 122, hence the saw blade drive mechanism 111 and the saw blade 112 will have no transverse movement. It will be understood that in order to realize the linear movement of the saw blade drive mechanism 111 and the saw blade 112 in a more stable manner, it is preferable that a guide member be additionally provided to guide the movement directions thereof.

It can be seen from FIG. 1 that the guide member 140 provides guidance and support for the movement of the balancing block 130. Details of the guide member 140 are shown more clearly in FIGS. 5 and 6. As shown in the figures, the guide member 140 may have a flat guide face 141. In the example shown in the figures, the guide face 141 may be divided into two sections by a depressed surface 144 at a position corresponding to the linked-movement mechanism; the two sections correspond to a first slide groove 131a part and a second slide groove 131b part on the balancing block 130 respectively. Two guide pins 142a and 142b may be respectively provided on the two sections of the guide face 141. In the arrangement of the hand-held machine tool, the guide member 140 is arranged such that a straight line on which the two guide pins lie serves as the second direction B, in a different plane from that of the first direction A of the saw blade drive mechanism 111 and the saw blade 112.

Figure 5:
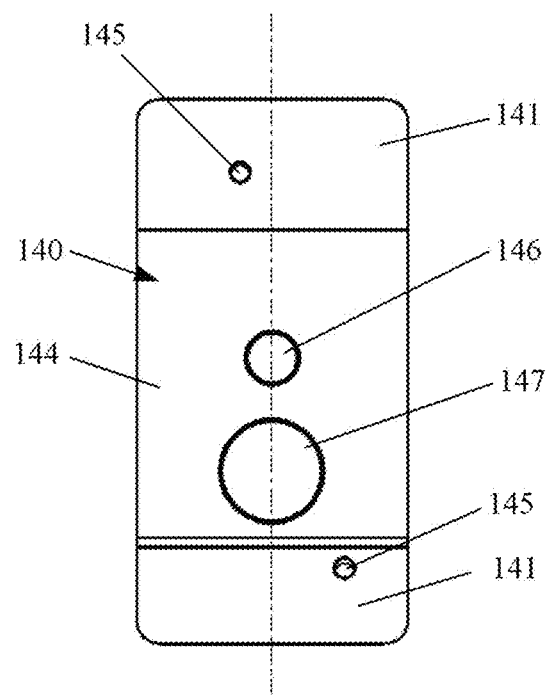
FIG. 5 shows a schematic front view of the guide member in the arrangement of FIG. 1.
Figure 6:
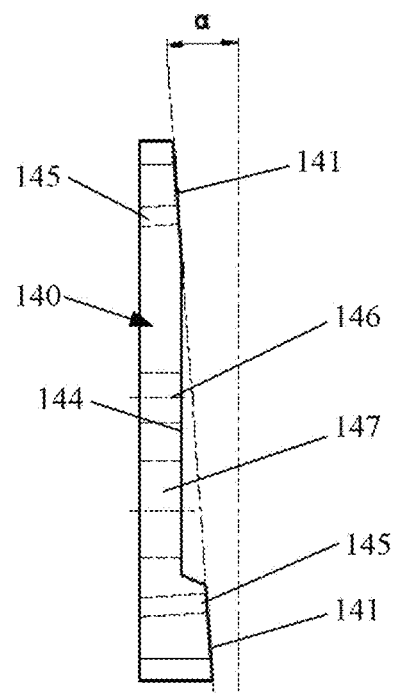
FIG. 6 shows a schematic side view of the guide member in FIG. 5.

Mounting holes 145 suitable for mounting the guide pins 142a and 142b are shown in FIGS. 5 and 6. The guide pins 142a and 142b may be fixed to the guide member 140 by being inserted in the mounting holes 145. The guide pins 142a and 142b are preferably perpendicular to the guide face 141.

In the embodiment shown in the figures, the surface 144 of the guide member 140 at the position corresponding to the linked-movement mechanism may be depressed and parallel to a first end side and a second end side of the gear 121, to prevent interference with end faces of the eccentric wheel 123 and the drive gear 151 etc. in the linked-movement mechanism. A mounting hole 146 for fixing a gear shaft 124, and a mounting hole 147 for fixing the drive gear 151 via the bearing 152, are formed in the depressed recess. It will be realized that when the gear shaft 124 and the bearing 152 etc. are fixed directly to the frame, through-holes for the gear shaft and the bearing etc. to pass through may be formed below the guide member 140, in order to prevent interference.

It will be realized that a structure different from that in the figures may be used for the guide member. For example, when the guide member is guide grooves located at two sides of the balancing block 130, there is no need for the mounting holes 146 and 147 etc. to be left in the guide member in advance, as in the example shown in FIG. 9. The gear shaft 124 and the bearing 152 of the drive gear 151 etc. may all be mounted in a fixed manner on the frame directly.

Figure 7:
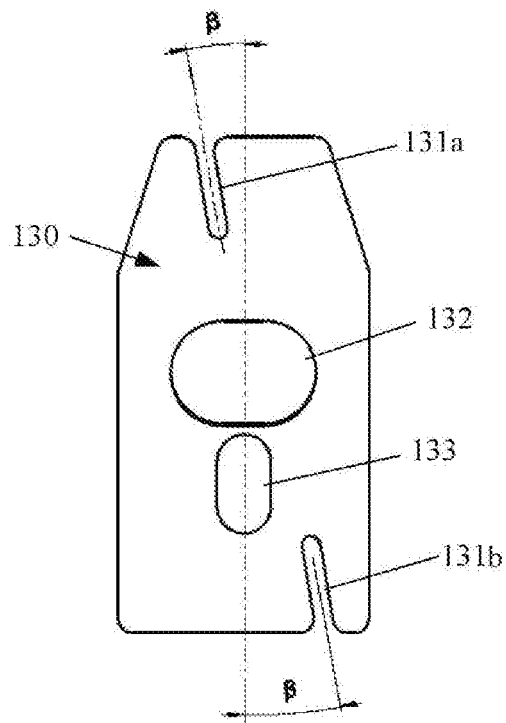
FIG. 7 shows a schematic front view of the balancing block in the arrangement of FIG. 1.
Figure 8:
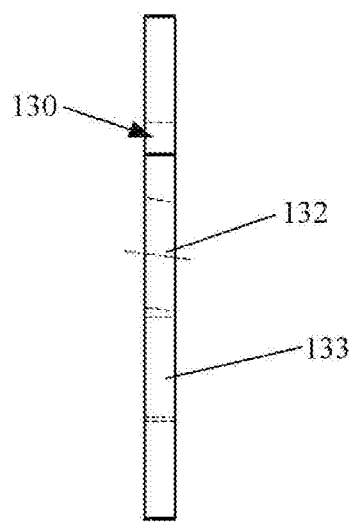
FIG. 8 shows a schematic side view of the balancing block in FIG. 7.

FIGS. 7 and 8 show details of the balancing block 130. As shown in FIG. 7, the first slide groove 131a and the second slide groove 131b may be formed at two ends of the balancing block 130 respectively, with the first slide groove 131a and the second slide groove 131b being parallel or on the same line. These slide grooves are preferably straight slide grooves, and may be open grooves, being open towards the two ends of the balancing block 130 respectively. Such an arrangement of open grooves can facilitate the machining and assembly of the balancing block. Rounded corners at the open grooves can facilitate the insertion of the guide pins into the slide grooves. It will be realized that in an optional embodiment, it is also possible for these slide grooves to not be provided with openings at the two ends.

The balancing block 130 is adapted to be in close contact with the guide face 141 and can move along the guide face. As stated above, and as shown in FIGS. 1 and 4, the guide pins 142a and 142b on the guide face 141 are engaged in the first slide groove 131a and the second slide groove 131b respectively, and relative sliding movement is possible between the guide pins 142a and 142b on the one hand and the first slide groove 131a and second slide groove 131b on the other. Preferably, the diameters of the guide pins 142a and 142b are substantially equal to or slightly larger than the widths of the first slide groove 131a and the second slide groove 131b, so that the engagement between the guide pin and the slide groove will not be too tight or too loose. Backstop members 143a and 143b may also be provided on the guide pins 142a and 142b, for the purpose of limiting the balancing block 130 to being in close contact with the guide face 141, and prevent the balancing block from falling off accidentally. In the embodiment shown in the figures, the backstop members 143a and 143b are round stop plates. Based on the above, the balancing block 130 is limited so as to be only able to move in directions defined by the guide pins 142a and 142b on the guide face 141.

With regard to the guide pins on the guide member 140 and the slide grooves on the balancing block 130, it must also be pointed out that the quantities of the guide pins and the slide grooves need not be limited to the quantities shown in the figures. Where production efficiency and manufacturing costs permit, providing a greater number of guide pins and slide grooves in parallel or along the same straight line can on the contrary increase the stability of movement of the balancing block on the guide member.

As shown in FIGS. 7 and 8, an obround hole 132 adapted to be driven by the eccentric wheel 123, and a through-hole 133 adapted to be passed through by the drive gear 151, may also be formed in the balancing block 130. The through-hole 133 is also suitable for being designed as a long hole, so as not to interfere with the drive gear 151 during upward/downward movement of the balancing block 130. The obround hole 132 is substantially transversely formed in the balancing block 130; an upper edge and a lower edge are straight, and two ends may each be arcuate. The diameter of the eccentric wheel 123 is preferably substantially equal to or slightly larger than the height of the obround hole 132, i.e. the distance between the upper edge and the lower edge. During operation of the hand-held machine tool, the eccentric wheel 123 can be engaged in the obround hole 132, with an outer periphery thereof being in contact with the upper edge or lower edge of the obround hole 132 and thereby being able to drive the balancing block 130 to reciprocate; at the same time, due to the guiding action of the slide grooves and the guide pins, the movement direction of the balancing block 130 is restricted to the second direction B. The transverse length of the obround hole 132 is sufficient to ensure that, in the course of operation, the eccentric wheel 123 will not drive, and even not come into contact with, the arcuate edges at the two ends of the obround hole 132. It can be seen that a crank slideway mechanism is actually also formed between the balancing block and the gear 121 via the eccentric wheel 123.

The linked-movement mechanism between the first moving component 110 and the balancing block 130 is described in detail below. Referring to FIGS. 1 to 4, it can be seen that in the embodiment shown in the figures, the linked-movement mechanism may comprise the drive gear 151 and the gear 121, etc. The drive gear 151 may be mounted in the mounting hole 147 of the guide member 140 via the bearing 152. The drive gear 151 is engaged with the gear 121 and provides motive power thereto, thereby driving the first moving component 110 and the balancing block 130. The gear 121 may be mounted in the mounting hole 146 of the guide member 140 via the gear shaft 124. The first end side of the gear 121 may be provided with the drive pin 122, which is used for the first moving component 110 and arranged eccentrically, and is adapted to be engaged in the obround hole 113 of the first moving component 110. The second end side of the gear 121 may be provided with the eccentric wheel 123 used for driving the balancing block 130.

It can be seen that the manner of movement of the gear 121 and the drive gear 151 etc. in the linked-movement mechanism is rotation, which is different from the first moving component 110, and will give rise to undesired vibration. It will be understood that the linked-movement mechanism is also included within the category of the second moving component 120 in the sense of the present disclosure. It should be understood that the second moving component 120 in the present disclosure may further comprise moving components in other forms besides the first moving component 110 in the mechanism or machine tool, for example but not limited to other components which perform movement such as linear movement, rotation and swinging etc. in the operational state of the machine tool; these will also become partial secondary vibration sources. These moving components might be performing complex movements of all kinds; although the vibration etc. generated by these moving components has a smaller effect than the first moving component 110, the movement pattern thereof is more complex and unmeasurable, so it is more difficult to balance the shaking and swinging etc. of the mechanism or machine tool.

Under the teaching of the present application, those skilled in the art would be able to think of using another form of linked-movement mechanism. For example, an oscillating bearing may be used as the linked-movement mechanism; in view of the fact that the use of a particular oscillating bearing in a hand-held machine tool is known, the structure thereof is not specifically described here. According to the present disclosure, the orientation of a guide rod in an oscillating bearing mechanism in the hand-held machine tool may be suitably adjusted, so as to change the direction of reciprocation of the balancing block. It will be realized that the oscillating bearing will similarly also become a part of a secondary vibration source.

Furthermore, in another embodiment, the linked-movement mechanism could be removed, and two different motive power sources could be used to drive the first moving component and the balancing block separately to move at opposite paces; as will be understood, this might be restricted in terms of production costs and operational precision. As stated above, in the hand-held machine tool or specifically the saw in the present example, a main vibration source is generated by reciprocation of the first moving component 110 in a straight line. When the saw is operating, the saw blade will reciprocate at high speed relative to the saw, substantially in a straight line, causing the saw itself to vibrate fiercely. Correspondingly, if the hand-held machine tool is a hand-held electric hammer, then the first moving component 110 may be a hammer implement or a hammer implement drive mechanism; an impact force of the reciprocation thereof is stronger. In the absence of a balancing design, large-amplitude shaking and swinging of the hand-held electric hammer is easily caused, seriously affecting device operation.

It is precisely in order to balance the vibration caused by the abovementioned first moving component 110 and second moving component 120 that the balancing block 130 is provided according to the arrangement in the embodiment shown in the figures. The balancing block 130 reciprocates in a straight line in the second direction B, which lies in a different plane from that of the first direction A, and the pace of movement of the balancing block 130 is opposite to that of the first moving component 110. Here, "opposite paces" means that the tendencies of action of the motions of the balancing block and the first moving component on the entire product cancel each other out, so that dynamic balance can be substantially realized. They move substantially in opposite directions. In the example shown in the figures specifically, on the gear 121, the drive pin 122 and the eccentric wheel 123 are located on different sides of a rotation axis of the gear 121 along the same diameter, and it can be seen that when the drive pin 122 drives the first moving component 110 upwards, the eccentric wheel 123 drives the balancing block 130 downwards; when the drive pin 122 drives the first moving component 110 downwards, the eccentric wheel 123 drives the balancing block 130 upwards.

It will be understood that, to a person skilled in the art, the reciprocation "substantially" in a straight line as described in the context is clear. Firstly, absolute reciprocation in a straight line could not possibly take place in practice; absolute linear motion only exists in an ideal state, and in practice, there will inevitably be slight deviation from a straight line. Secondly, in actual design, the trajectory of movement of a tool head will be designed to deviate slightly from a straight line, due to considerations of functionality. Through the present application, those skilled in the art will understand that the meaning of reciprocation "substantially" in a straight line herein will include the abovementioned concept, and at the same time, reciprocation in a straight line in the ideal case will also fall within the scope of the present disclosure.

It will be understood that, to a person skilled in the art, the "first direction A" and the "second direction B" described in the context may be represented by rays passing in corresponding directions through the centre of mass of the first moving component and the centre of mass of the balancing block respectively. The corresponding rays will lie in positions of straight lines in different planes, and are neither parallel nor intersecting.

FIG. 9 shows an arrangement of a balancing block in a hand-held machine tool according to another embodiment of the present disclosure, in a schematic three-dimensional drawing, wherein a first moving component 210, a linked-movement mechanism 220, the balancing block 230 and guide members 240 are shown. As can be seen, four guide members 240 define the movement direction of the balancing block 230. The guide members 240 have U-shaped guide grooves, and two side edges of the balancing block 230 are guided in the U-shaped guide grooves. Clearly, as stated above, the guide pins and mounting holes etc. on the guide member 140 in the embodiment in FIG. 1 are no longer arranged on the guide member 240; there is also no need for structures such as the slide grooves to be provided on the balancing block 230. The linked-movement mechanism 220 here may also be replaced by a non-crank slideway mechanism, e.g. an oscillating bearing mechanism, etc.

Figure 10:
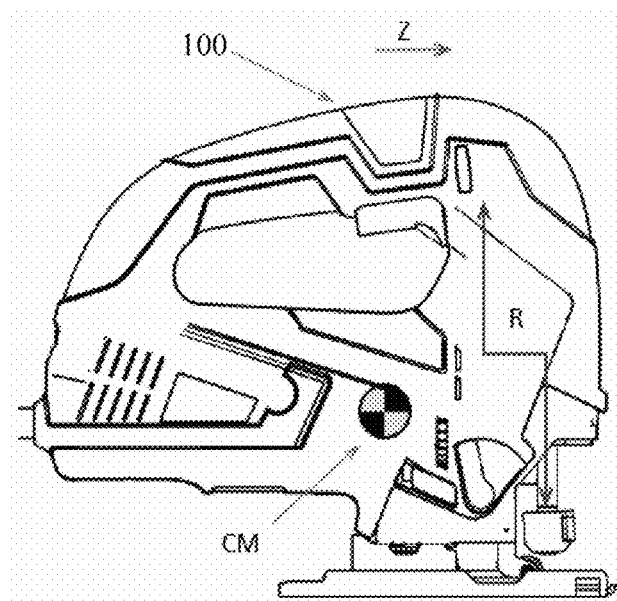
FIGS. 10, 11 and 12 show the vibrations caused by forces or torques which are overcome by the balancing block in the hand-held machine tool according to the present disclosure.
Figure 11:
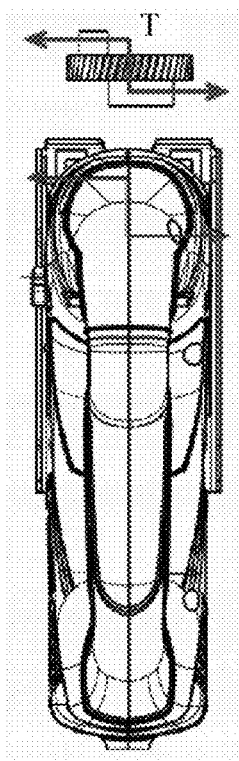
Figure 12:
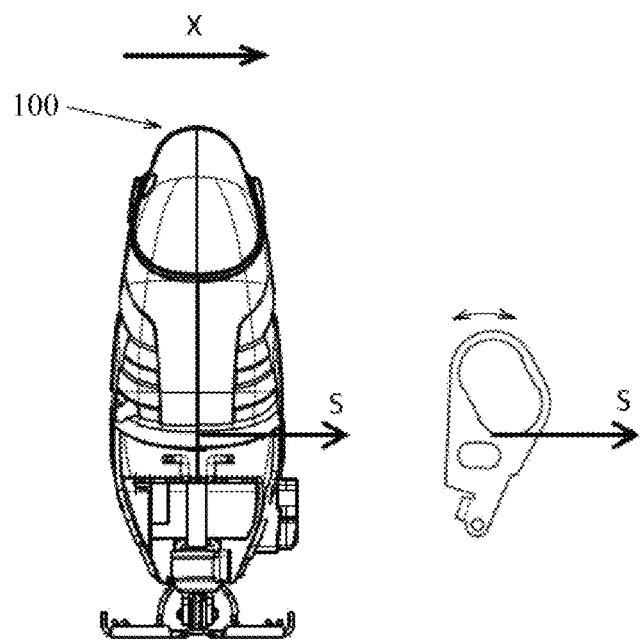

As an example, FIGS. 10, 11 and 12 show inertia forces or moments of inertia which have not yet been balanced by the balancing block in the prior art. CM in FIG. 10 represents the position of the centre of mass of the machine tool as a whole; an inertia torque R of a blade frame (the first moving component 110) and the balancing block acting on the machine tool is marked in the figure, and the inertia torque R causes the hand-grip region 100 to have the tendency to move in the Z direction. In order to weaken this movement tendency, according to the present disclosure, the balancing block should be arranged obliquely in the direction of the angle α shown in FIG. 3. FIG. 12 shows an inertia force S acting on the machine tool when a swing rod member (the second moving component) is moving; the inertia torque S causes the hand-grip region 100 to have the tendency to move in the X direction. In order to weaken this movement tendency, according to the present disclosure, the balancing block should be arranged obliquely in the direction of the angle β shown in FIG. 4. FIG. 11 shows a swing tendency T at a hand-held part of the machine tool caused by the linked-movement mechanism including for example the rotation of the gear itself, etc. The hand-held machine tool of the present disclosure can effectively balance these factors which are not favourable for the reduction of tool vibration, thereby increasing the operational stability of the machine tool.

Referring to FIGS. 1 to 4 will facilitate the understanding of the inertia force caused by rotation of the gear 121 itself. As shown in the figures, the gear 121 can rotate in a plane parallel to the first direction A, simultaneously driving the first moving component 110 and the balancing block 130 to move; a movement state of the gear 121 comprises a movement state causing the gear 121 itself to have an inertia force in a direction other than the first direction A when rotating. It will be understood that the centre of mass CM (see FIG. 10) of the machine tool as a whole and the first direction A define a centre of mass plane, and the movement state of the gear 121 may comprise a movement state causing the gear 121 itself to have an inertia force outside the centre of mass plane when rotating. As another example, the second moving component 120 may further comprise an accompanying moving component, which is driven by the gear 121 and swings outside the centre of mass plane; the accompanying moving component may be a swing rod member, which is associated with the gear 121 and periodically drives the first moving component to swing forwards, see FIG. 12. Furthermore, the movement state of the gear 121 may further comprise a movement state causing the gear 121 itself to have a tendency to turn over perpendicularly to a gear shaft when rotating. It will be understood that these movement states are all movement states which can be balanced by the balancing block in the present disclosure. Comparatively speaking, the tendencies to vibrate, swing and turn over etc. caused by these movement states cannot be balanced in the prior art.

Based on the above teaching with reference to the hand-held saw, those skilled in the art would be able to think of arranging and using the abovementioned balancing block in the case of another hand-held machine tool. It will be understood that, in this case, the first moving component may be a corresponding operation execution component in the hand-held machine tool, and the second moving component may comprise a linked-movement mechanism such as an eccentric gear, an oscillating bearing or a swing rod member, and may simultaneously include any other moving component; the balancing block is used to (at least partially) simultaneously balance imbalances caused by the first moving component and the second moving component. In this case, the guide member 140 should preferably be fixed to the frame of the hand-held machine tool. When the hand-held machine tool is a hand-held reciprocating saw, the first moving component 110 may be a saw blade or a saw blade drive mechanism. When the hand-held machine tool is a hand-held electric hammer, the first moving component 110 may be a hammer implement or a hammer implement drive mechanism.

The technical scope of the present disclosure is not limited to the content of the explanation above. Those skilled in the art could make various changes and amendments to the embodiments above without departing from the technical thinking of the present disclosure, and all such changes and amendments should be included in the scope of the present disclosure.

The invention claimed is:

1. A hand-held machine tool, comprising:
a first moving component as a main vibration source, the first moving component reciprocating substantially in a straight line in a first direction and arranged in a first plane;
a second moving component as a secondary vibration source, the second moving component having a second movement state different from a first movement state of the first moving component; and
a balancing block configured to move linearly in a second direction and arranged in a different plane than the first plane and non-parallel to the first plane, a movement pace of the balancing block being opposite to a movement pace of the first moving component.

2. The hand-held machine tool according to claim 1, wherein an included angle of the first direction and the second direction is set such that a stability of a specific region of the hand-held machine tool is optimized when the hand-held machine tool is operating.

3. The hand-held machine tool according to claim 2, wherein the specific region is a hand-grip region of the hand-held machine tool.

4. The hand-held machine tool according to claim 2, wherein the included angle between the first and second directions is determined in the different plane with the first direction projected onto the different plane, the included angle being greater than zero.

5. The hand-held machine tool according to claim 1, wherein the hand-held machine tool further comprises a linked-movement mechanism between the first moving component and the balancing block.

6. The hand-held machine tool according to claim 5, wherein the linked-movement mechanism is one of a crank slideway mechanism and an oscillating bearing mechanism.

7. The hand-held machine tool according to claim 1, wherein the hand-held machine tool comprises a guide member configured to guide the balancing block to move linearly in the second direction.

8. The hand-held machine tool according to claim 7, wherein the guide member is one of a guide groove and a guide rod.

9. The hand-held machine tool according to claim 7, wherein:
a first slide groove is defined at a first end of the balancing block and a second slide groove is defined at a second end of the balancing block, the first slide groove and the second slide groove being parallel or on the same line, and
the guide member has a flat guide face, with guide pins provided on the guide face in the second direction, the guide pins being engaged in the first slide groove and the second slide groove of the balancing block respectively.

10. The hand-held machine tool according to claim 9, wherein the guide member defines a recess or through-hole for avoiding interference.

11. The hand-held machine tool according to claim 9, wherein backstop members are disposed on the guide pins, the backstop members configured to limit the balancing block to being in close contact with the guide face.

12. The hand-held machine tool according to claim 1, wherein the first direction passes through a center of mass of the first moving component, and the second direction passes through a center of mass of the balancing block.

13. The hand-held machine tool according to claim 1, wherein the hand-held machine tool is a hand-held reciprocating saw and the first moving component is a saw blade or a saw blade drive mechanism, or the hand-held machine tool is a hand-held electric hammer and the first moving component is one of a hammer implement and a hammer implement drive mechanism.

14. The hand-held machine tool according to claim 1, wherein the second moving component comprises a gear which rotates in a plane parallel to the first direction, the gear configured to simultaneously drive the first moving component and the balancing block to move, and the second movement state comprising a third movement state causing the gear to have an inertia force in a direction other than the first direction when rotating.

15. The hand-held machine tool according to claim 14, wherein the second movement state further comprises a fourth movement state causing the gear to have a tendency to turn over perpendicularly to a gear shaft of the gear when rotating.

16. The hand-held machine tool according to claim 1, wherein the second moving component comprises a gear configured to simultaneously drive the first moving component and the balancing block to move, and a center of mass of the machine tool as a whole and the first direction define a center of mass plane, the second movement state comprising a third movement state causing the gear to have an inertia force outside the center of mass plane when rotating.

17. The hand-held machine tool according to claim 16, wherein the second moving component further comprises an accompanying moving component, which is driven by the gear and swings outside the center of mass plane.

18. The hand-held machine tool according to claim 17, wherein the accompanying moving component is a swing rod member, which is associated with the gear and periodically drives the first moving component to swing forwards.

19. The hand-held machine tool according to claim 1, wherein the first direction and the second direction are non-parallel for any position of the first moving component in the first movement state.

* * * * *